A. R. KERR.
ASH SIFTER.
APPLICATION FILED DEC. 4, 1912.
1,085,434.
Patented Jan. 27, 1914.
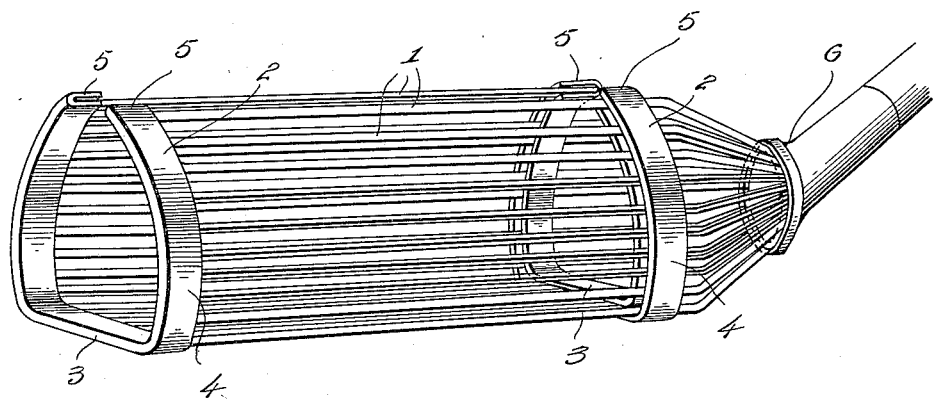
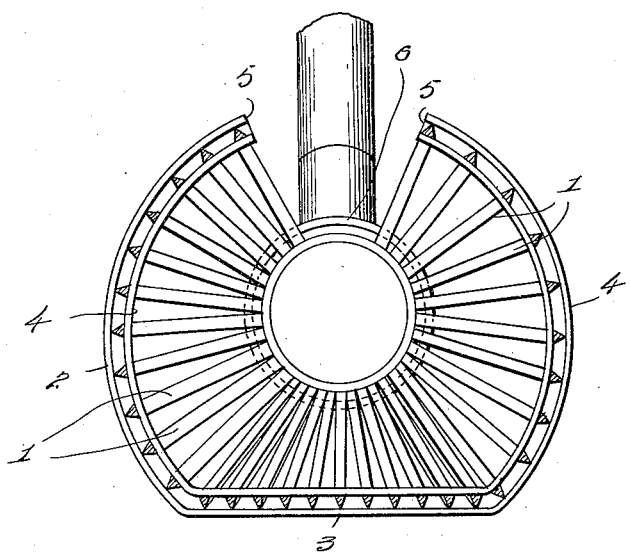
Witnesses
Chas. E. Kemper,
D. W. Gould.
Inventor
A. R. Kerr.
By Victor J. Evans
Attorney

UNITED STATES PATENT OFFICE.

ALEXANDER R. KERR, OF SIOUX CITY, IOWA.

ASH-SIFTER.

1,085,434.  Specification of Letters Patent.  Patented Jan. 27, 1914.

Application filed December 4, 1912.  Serial No. 734,908.

*To all whom it may concern:*

Be it known that I, ALEXANDER R. KERR, a citizen of the United States, residing at Sioux City, in the county of Woodbury and State of Iowa, have invented new and useful Improvements in Ash-Sifters, of which the following is a specification.

The invention relates to an improvement in ash sifters designed particularly for use in a manner similar to a shovel and capable of convenient manipulation to expeditiously sift the cinders with any desired degree of gradation.

The primary object of the invention is the provision of an ash sifter in which the material to be sifted is taken up by an operation similar to that of a shovel and which sifter is so constructed that the retained cinders may be graded as desired.

The invention in its preferred form of details will be described in the following specification, reference being had to the accompanying drawing, in which:

Figure 1 is a perspective view of the improved sifter. Fig. 2 is a transverse section of the same.

Referring particularly to the accompanying drawing, the improved sifter is made up of a series of bars 1 of triangular shape in cross section. The bars are connected in spaced parallel relation between tie strips 2, which strips are spaced apart a distance equal to that desired for the length of the sifter. The strips 2 which as shown are arranged in spaced parallel relation transverse the sifter have their lower or bearing portions 3 flat and the side portions 4 curved, the ends 5 of the strip being spaced apart a distance corresponding to that desired in accordance with the kind of material being sifted.

As previously described the bars 1 extend in spaced parallel relation longitudinally of the sifter between the strips, being connected to the latter in any appropriate way and the strips preferably arranged so that one flat side thereof is in line with the plane of the strips, the converging sides of each bar projecting outwardly, as shown. By this means the least distance between any neighboring bars is in line with their inner surfaces from which point the space increases.

Throughout the flat portion 3 of the strips the bars 1 are equally spaced and present the narrowest spacing between the bars of the particular sifter. Throughout one curved section of the adjacent strips the connecting bars 1 are spaced a greater distance apart than throughout the flat portion, while throughout the other curved portion the bars 1 are unequally spaced in that a few bars immediately adjacent the bottom are spaced apart a distance corresponding to the spacing of the bars on the opposite curved portion while the remaining bars are spaced apart a distance greater than any of the bars previously described. By this means the flat portion presents the finest sifter, one curved portion presents a somewhat coarser sifter and the remaining curved portion presents in part a sifter corresponding in coarseness to the first-mentioned curved portion and a second sifter having a maximum coarseness of the device. The bars 1 are extended beyond one strip 2 and are bent on inwardly converging lines each bar being bent inward toward the longitudinal medial line of the device terminating, however, so as to form a connection for a handle 6. The bars 1 by this formation maintain their relative spacings toward the lower or receiving end of the sifter.

In use the sifter is manipulated as an ordinary shovel being forced into the pile of ashes in the ash pit or the like until a sufficient quantity has been taken up whereupon the sifter is manipulated in an obvious manner to separate the cinders and fine material, it being understood that the sifter is during such manipulation turned in a manner to secure the desired gradation of the finer material to be saved.

The parts of the device are constructed wholly of metal and as the device is made up in effect of but few parts it is obvious that it will stand a considerable degree of rough handling without in any way destroying its effectiveness as a sifter.

What is claimed is:—

1. An ash sifter comprising a body including transversely disposed strips, triangular bars secured to the strips and extended in spaced parallel relation, said bars extending beyond one of the strips on convergent lines to form a handle end, the bars throughout the parallel portions being arranged in sections of graded spacings.

2. An ash sifter including a handle and a sifting member, the latter comprising a series of approximately parallel bars projected in the same plane to form an approximately straight portion to provide the sifter bottom and a series of parallel bars extending upwardly from each side edge on the bottom on curved lines to form sides, the spacing between the upper free edges of the sides being materially less than the width of the bottom, the spacing between the bars forming the sides being greater than the spacing between the bars forming the bottom whereby to provide a sifter having graduated sifting spaces.

In testimony whereof I affix my signature in presence of two witnesses.

ALEXANDER R. KERR.

Witnesses:
J. A. KEITH,
F. RICHON.

Copies of this patent may be obtained for five cents each, by addressing the "Commissioner of Patents, Washington, D. C."